(12) United States Patent
Bakalas et al.

(10) Patent No.: US 11,384,832 B1
(45) Date of Patent: Jul. 12, 2022

(54) SYSTEM AND METHOD FOR NEUTRAL TRANSMISSION HOLD

(71) Applicant: Honda Motor Co., Ltd., Tokyo (JP)

(72) Inventors: Alexander P. Bakalas, Marysville, OH (US); Robert E. Settles, Jr., Sunbury, OH (US); Jeremy P. Cottam, Dublin, OH (US); Shumpei Hino, Dublin, OH (US); Shawn P. Kelly, Powell, OH (US); Kenichi Harada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/221,424

(22) Filed: Apr. 2, 2021

(51) Int. Cl.
*F16H 59/02* (2006.01)
*F16H 59/50* (2006.01)
*F16H 59/68* (2006.01)
*F16H 59/08* (2006.01)

(52) U.S. Cl.
CPC ............ *F16H 59/50* (2013.01); *F16H 59/08* (2013.01); *F16H 59/68* (2013.01); *F16H 2059/0221* (2013.01); *F16H 2059/081* (2013.01)

(58) Field of Classification Search
CPC .......... F16H 59/50; F16H 59/08; F16H 59/68; F16H 2059/0221; F16H 2059/081
See application file for complete search history.

(56) References Cited

U.S. PATENT DOCUMENTS

| | | | |
|---|---|---|---|
| 8,016,719 B2 | 9/2011 | Hecht et al. | |
| 8,062,176 B2 | 11/2011 | Hecht et al. | |
| 8,062,177 B2 | 11/2011 | Hecht et al. | |
| 8,128,530 B2 | 3/2012 | Hecht et al. | |
| 8,235,866 B2 | 8/2012 | Steinhauser et al. | |
| 8,515,635 B2 | 8/2013 | Spaulding et al. | |
| 8,521,378 B2 | 8/2013 | Steinhauser et al. | |
| 8,634,995 B2 | 1/2014 | Deurloo et al. | |

(Continued)

FOREIGN PATENT DOCUMENTS

| | | | | |
|---|---|---|---|---|
| DE | 102013221895 A1 | * | 5/2014 | ............. B60K 20/08 |
| DE | 102016224506 A1 | * | 6/2018 | ............. F16H 59/08 |

(Continued)

OTHER PUBLICATIONS

"2016 Pilot Electronic Gear Selector" (Accessed Dec. 4, 2019).

(Continued)

*Primary Examiner* — Justin Holmes
(74) *Attorney, Agent, or Firm* — Rankin, Hill & Clark LLP

(57) ABSTRACT

A method and system for vehicle control including detecting a change in a position of a transmission input interface to a neutral position indicating a transmission mode of the vehicle is shifted into a neutral gear. Responsive to receiving an input sequence at the transmission input interface, changing a neutral hold mode of the vehicle to active. The input sequence at the transmission input interface includes changing the position of the transmission input interface to a park position, holding the position of the transmission input interface at the park position for a predetermined length of time, and changing the position of the transmission input interface to the neutral position. Further, controlling the vehicle to maintain the neutral gear responsive to a change in a vehicle occupancy state while the neutral hold mode is active.

20 Claims, 7 Drawing Sheets

(56) References Cited

U.S. PATENT DOCUMENTS

| | | |
|---|---|---|
| 8,688,339 B2 | 4/2014 | Fyie et al. |
| 8,897,978 B2 | 11/2014 | Fyie et al. |
| 9,200,707 B2 | 12/2015 | Spaulding et al. |
| 9,328,819 B2 | 5/2016 | Deurloo et al. |
| 9,371,903 B2 | 6/2016 | Deurloo et al. |
| 9,616,877 B2 | 4/2017 | Tanida |
| 9,650,019 B2 | 5/2017 | Weston |
| 9,714,706 B1 | 7/2017 | Szawarski et al. |
| 9,726,284 B2 | 8/2017 | Adams, Jr. et al. |
| 9,862,360 B2 | 1/2018 | Lapeer et al. |
| 9,994,222 B2 | 6/2018 | Khafagy et al. |
| 10,023,190 B2 | 7/2018 | McDonnell et al. |
| 10,221,940 B2 | 3/2019 | Wozniak |
| 10,407,044 B2 | 9/2019 | Harris et al. |
| 2016/0280226 A1 | 9/2016 | Spoerl et al. |
| 2018/0128371 A1 | 5/2018 | Ulrey et al. |
| 2018/0201265 A1 | 7/2018 | Megyesi et al. |
| 2018/0237016 A1 | 8/2018 | Khafagy et al. |
| 2019/0084569 A1 | 3/2019 | Shibata et al. |

FOREIGN PATENT DOCUMENTS

| | | | | |
|---|---|---|---|---|
| DE | 102018129301 A1 | * | 5/2019 | ............. F16H 59/08 |
| GB | 2441337 A | * | 3/2008 | ............. B60K 20/02 |

OTHER PUBLICATIONS

"My Chevy Bolt.com—Car wash mode—Post # 4" (Accessed Dec. 4, 2019).

Screen captures from YouTube video clip entitled "Rotary Gear Shift Dial with Stay in Neutral Mode | Ford How-To | Ford" 3 pages, uploaded on Jan. 13, 2018 by user "Ford Motor Company". Retrieved from Internet: < https://youtu.be/2Gf7glfn1Fw>.

Fitzgerald, Craig. "These 33 Vehicles Need Special Help to Drive Through a Car Wash" BestRide.com; (Accessed Dec. 4, 2019).

\* cited by examiner

SYSTEM AND METHOD FOR NEUTRAL TRANSMISSION HOLD

BACKGROUND

Some vehicles with a shift-by-wire (SBW) transmission implement features to prevent unwanted motion of the vehicle. For example, some vehicles apply an automatic shift to a park transmission mode when a vehicle door is opened and/or a seat belt is unfastened. However, in some situations when a vehicle is in a neutral transmission mode, a driver may want to get out of the vehicle while maintaining the neutral transmission mode. For example, the driver may want to exit the vehicle upon shifting the vehicle into the neutral transmission mode at a valet type conveyor car wash. Here, the driver's intention is to leave the vehicle in the neutral transmission mode and not to shift into a park transmission mode (e.g., controlled by an automatic shift to park function). In these types of situations, intuitive control of the vehicle is appropriate to ensure the vehicle maintains the desired transmission mode.

BRIEF DESCRIPTION

According to one aspect, a computer-implemented method for controlling a vehicle includes detecting a change in a position of a transmission input interface to a neutral position indicating a transmission mode of the vehicle is shifted into a neutral gear. Responsive to receiving an input sequence at the transmission input interface, changing a neutral hold mode of the vehicle to active. The input sequence at the transmission input interface includes changing the position of the transmission input interface to a park position, holding the position of the transmission input interface at the park position for a predetermined length of time, and changing the position of the transmission input interface to the neutral position. Further, controlling the vehicle to maintain the neutral gear responsive to a change in a vehicle occupancy state while the neutral hold mode is active.

According to another aspect, a vehicle control system includes an engine, a transmission, a transmission input interface, and a controller operatively connected for communication with the engine, the transmission, and the transmission input interface. The controller detects a position of a transmission input interface is in a neutral position indicating a transmission mode of the vehicle is shifted into a neutral gear. The controller detects an input sequence at the transmission input interface including changing the position of the transmission input interface to a park position, holding the position of the transmission input interface at the park position for a predetermined length of time, and changing the position of the transmission input interface to the neutral position. The controller changes a neutral hold mode from inactive to active and controls the transmission to maintain the neutral gear responsive to a change in a vehicle occupancy state while the neutral hold mode is active.

According to a further aspect, a non-transitory computer-readable storage medium including instructions that when executed by a controller, causes the controller detect a position of a transmission input interface is in a neutral position indicating a transmission mode of a vehicle is in a neutral gear and receive an input sequence signal from the transmission input interface. The transmission input interface includes a first input sequence signal indicating a change in a position of the transmission input interface to a park position and a second input sequence signal indicating a change in the position of the transmission input interface from the park position to the neutral position. A length of time the transmission input interface is in the park position is greater than a predetermined length of time. Further causing the controller to change a neutral hold mode to active and control the transmission to maintain the neutral gear regardless of a change in a vehicle occupancy state while the neutral hold mode is active.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
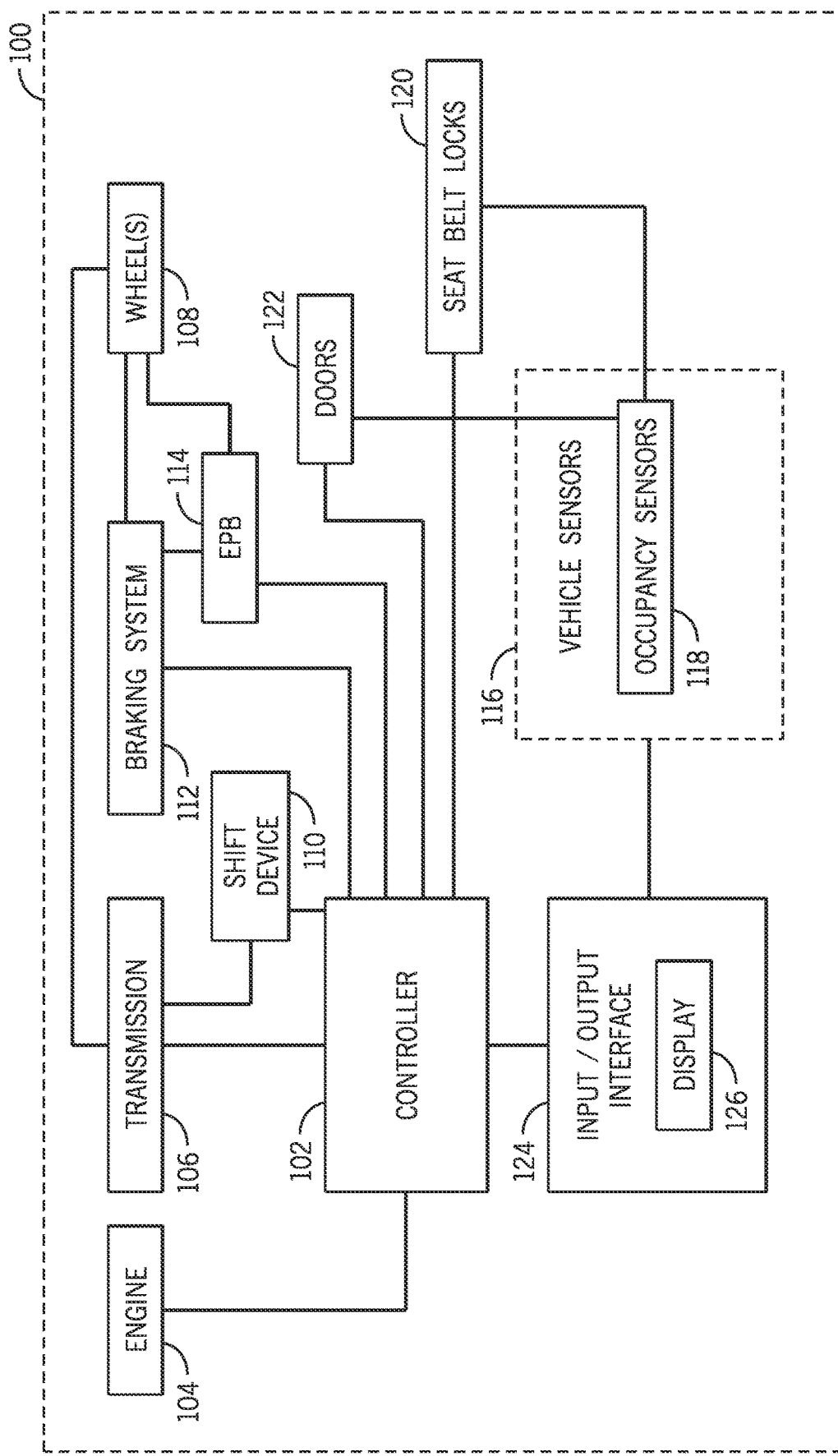
FIG. 1 is a schematic diagram of a vehicle including a system for implementing neutral transmission hold according to an exemplary embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network, a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Occupant" as used herein refers to a passenger of a vehicle and/or a user of a vehicle. An operator of an automotive vehicle is an occupant of the vehicle. As the terms are used herein, an "operator" of a vehicle, a "driver" of a vehicle, and a "user" of a vehicle are equivalent.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Referring now to the drawings, wherein the showings are for purposes of illustrating one or more exemplary embodiments and not for purposes of limiting same, FIG. 1 is a schematic view of a vehicle 100 for implementing systems and methods for neutral transmission hold according to an exemplary embodiment. It is understood that the components of the vehicle 100, as well as the components of other systems, hardware architectures, and software architectures discussed herein, can be combined, omitted, or organized into different architectures for various embodiments. In FIG. 1, the vehicle 100 includes a controller 102, which is operably connected for computer communication to an engine 104 and a transmission 106. Power from the engine 104 is transmitted to the transmission 106 to drive wheel(s) 108.

Generally, the controller 102 can include provisions for processing, communicating, controlling and/or interacting with the various components associated with the engine 104, the transmission 106, and/or other systems of the vehicle 100 that will be discussed herein. Although not shown in FIG. 1, the controller 102 can include a processor, a memory, and/or a database for supporting operations of the controller 102. Thus, the controller 102 can include logic circuitry with hardware, firmware, and software architecture frameworks for facilitating control of the vehicle 100 and facilitating communication and processing between various components and/or systems of the vehicle 100. In some embodiments, this can include application frameworks, kernels, libraries, drivers, application program interfaces, among others, to execute and control hardware and functions discussed herein. It is understood that the controller 102 can include multiple controllers communicating via a vehicle network (not shown).

The engine 104 can be any device, machine, or component that is capable of converting energy. Some examples of engines include, but are not limited to: internal combustion engines, electric motors, solar energy converters, turbines, nuclear power plants, and hybrid systems that combine two or more different types of energy conversion processes. Although not shown in FIG. 1, the vehicle 100 can include one or more batteries. It will be understood that in other embodiments, any other type of power source and/or arrangements of the components illustrated herein can be used for powering the vehicle 100.

As mentioned above, the transmission 106 uses power from the engine 104 to control the wheel(s) 108. A shift device interface 110 is operably connected for computer communication to the controller 102 and the transmission 106 for selecting a transmission mode of the transmission 106. The shift device interface 110 can be an electromechanical interface for controlling gear shifting of the transmission 106. An illustrative shift device interface 110 will be discussed in more detail herein with FIGS. 2A-2E. The transmission modes of the transmission 106 can include, but are not limited to, a park (P) transmission mode, a Reverse (R) transmission mode, a Neutral (N) transmission mode, a drive (D) transmission mode, and a sport (S) transmission mode. It is understood that other transmission modes not discussed herein can be implemented.

When the vehicle 100 is shifted into a park transmission mode, the controller 102 controls the transmission 106 to shift into park (e.g., a park gear). When the vehicle 100 is shifted into a reverse transmission mode, the controller 102 controls the transmission 106 to shift into reverse (e.g., a reverse gear) to enable the vehicle 100 to move backward. In a neutral transmission mode, the controller 102 controls the transmission 106 to a neutral gear to enable the wheel(s) 108 to move freely. In a drive transmission mode and/or a sport transmission mode, the controller 102 controls the transmission 106 to enable the vehicle 100 to move forward at a particular gear ratio.

The controller 102 is also operably connected for computer communication to a braking system 112 and an electronic park brake (EPB) switch 114. The braking system 112 controls braking of the wheel(s) 108. When the EPB switch 114 is triggered, an electronic parking brake operation is implemented. Specifically, the controller 102 controls the braking system 112 to hold the vehicle 100 in place so that the stopped state of the vehicle 100 is maintained by cable-pull means, caliper-integrating means, among others. Accordingly, regardless of the road gradient, movement of the vehicle 100 is prevented.

Referring again to the vehicle 100, the controller 102 is operatively connected for computer communication to vehicle sensors 116. The vehicle sensors 116 can be implemented with one or more of the components and/or systems of the vehicle 100. Generally, sensors discussed herein sense and measure a stimulus (e.g., a signal, a property, a measurement, a quantity) associated with the vehicle 100, a vehicle system and/or a vehicle component, the environment of the vehicle 100, and/or a biological being (e.g., vehicle occupants (not shown), pedestrians (not shown)). The vehicle sensors 116 can generate a data stream and/or a signal representing the stimulus, analyze the signal and/or transmit the signal to another component, for example the controller 102.

In the embodiment shown in FIG. 1, the vehicle sensors 116 include occupancy sensors 118 that provide data about a vehicle occupancy state of the vehicle 100. For example, the occupancy sensors 118 can be part of one or more seat belt locks 120 of the vehicle 100 and/or one or more doors 122 of the vehicle 100. Thus, the occupancy sensors 118 can include one or more seat belt sensors (not shown) that provide a signal indicative of a state of one or more of the seat belt locks 120 (e.g., being in an unlocked state or a locked state). Additionally, the occupancy sensors 118 can include one or more door sensors (not shown) that provides a signal indicative of a state of one or more of the doors 122 (e.g., being in an open state or a closed state).

It is understood that the occupancy sensors 118 can be any type of sensors and can be disposed in any area of the vehicle 100 for detecting the presence of one or more vehicle occupants in the vehicle 100. For example, although not shown in FIG. 1, the vehicle sensors 116 and/or the occupancy sensors 118 could be integrated into a dashboard, seat, bumper, front, rear, corners, dashboard, steering wheel, center console, roof or any other portion of the vehicle 100. In other cases, the vehicle sensors 116 and/or the occupancy sensors 118 could be portable sensors worn by a driver (not shown), integrated into a portable device (not shown), carried by the driver (not shown), integrated into an article of clothing (not shown) worn by the driver, or integrated into the body of the driver (e.g. an implant) (not shown). Accordingly, in addition to the methods of detecting a vehicle occupancy state of the vehicle 100 described herein, other types of methods can be implemented, for example, a weight sensor in a seat of the vehicle 100, position and/or location sensors worn by a vehicle occupant, image sensors capturing images of the interior of the vehicle 100, among others.

The controller 102 is also operatively connected for computer communication to an input/output interface 124 and a display 126. The input/output interface 124 can include provisions for receiving input from a user and/or communicating information to the user. In some embodiments, the input/output interface 124 can include one or more input buttons, switches, dials, a touch screen, a touch pad, a pointer, lights, microphones, speakers, among others. As will be discussed herein, the display 126 (e.g., a touch screen) can be situated in the interior of the vehicle 100 and used to output information about a transmission mode of the vehicle 100. In some embodiments, the shift device interface 110 can be a part of the input/output interface 124.

Figures 2A, 2B:
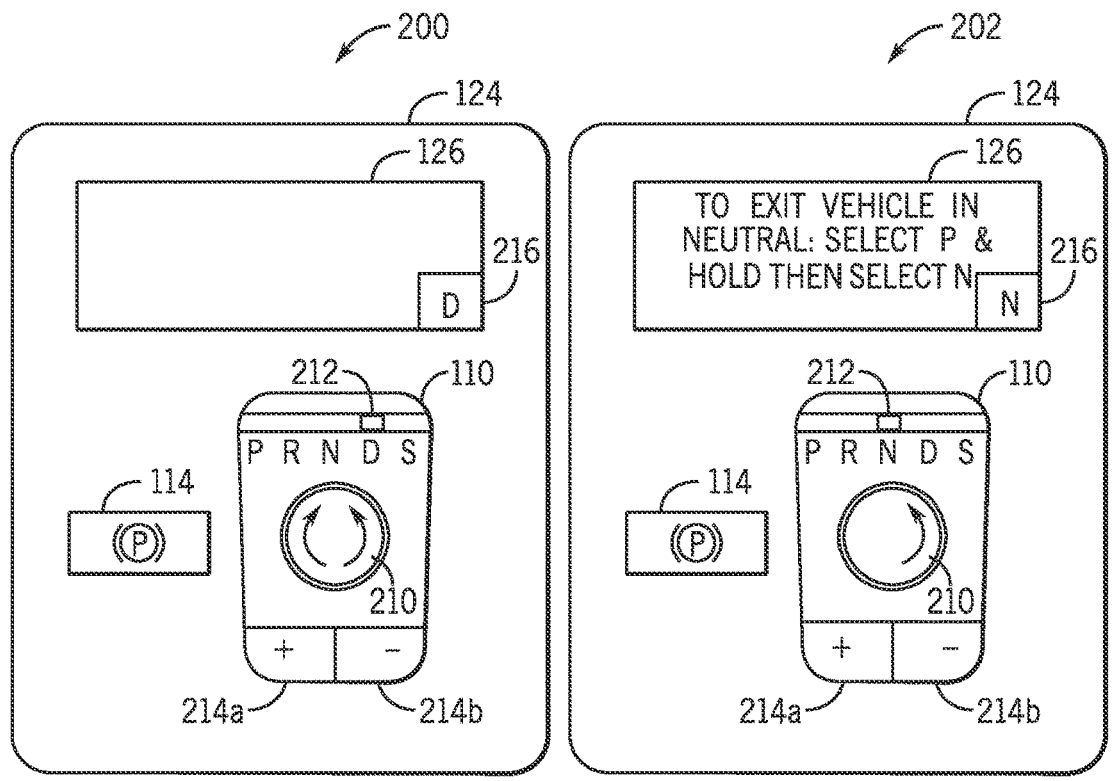
FIG. 2A is a top view of a vehicle interface located inside the vehicle of FIG. 1 showing part of an input sequence according to an exemplary embodiment.
FIG. 2B is a top view of a vehicle interface located inside the vehicle of FIG. 1 showing another part of the input sequence according to an exemplary embodiment.

The shift device interface 110 and the input/output interface 124 will now be described in more detail with reference to FIGS. 2A-2E, which illustrate exemplary views of the input/output interface 124. Each view in FIGS. 2A-2E illustrate different stages of input to control the vehicle 100 to enter a neutral hold mode. Referring now to FIG. 2A, a top view 200 of the input/output interface 124 is shown. One or more of the components of the input/output interface 124 can be located in one or more areas of the vehicle 100, for example, a center console, a dashboard, a heads-up-display, among others. The input/output interface 124 includes the display 126, which can display instructions for operating the vehicle 100 in a neutral hold mode and/or provide visual feedback about a transmission mode of the vehicle and/or a neutral hold mode state. For example, the display 126 can provide a gear indicator interface 216 that provides a visual display of a current transmission mode of the vehicle 100.

In FIGS. 2A-2E, the input/output interface 124 includes the shift device interface 110. The shift device interface 110 includes a transmission input interface 210, specifically, a rotary dial. In this example, a change in a position of the rotary dial is associated with a change in the transmission mode of the vehicle. However, it is understood that the transmission input interface 210 can be any type of input device for selecting a transmission mode of the vehicle 100 (e.g., a button, a slider, a dial button, a switch). In this example, the transmission input interface 210 is used to select a transmission mode (e.g., P,R,N,D,S) by manipulating the transmission input interface 210 in a left direction or a right direction. The position of the transmission input interface 210 corresponds to an indicator 212 to enable a user (not shown) to turn the transmission input interface 210 to the desired transmission mode indicated by the indicator 212. In FIG. 2B, the transmission input interface 210 has been manipulated to move the indicator 212 above the letter "N" indicating a shift from a drive transmission mode (e.g., FIG. 2A) into a neutral transmission mode.

When a transmission mode is selected by the transmission input interface 210, a signal is sent to the controller 102, which then controls the transmission 106 to operate according to the selected gear. The shift device interface 110 also includes a first paddle shifter 214a and a second paddle shifter 214b that allow a user to make a manual single sequential gear shift up or down of the vehicle 100. In FIGS. 2A-2E, the input/output interface 124 also includes the EPB switch 114, which in some embodiments may be referred to as an input button 114. Typically, a user engages and/or disengages the electronic parking brake function using the input button 114.

Figures 2C, 2D:
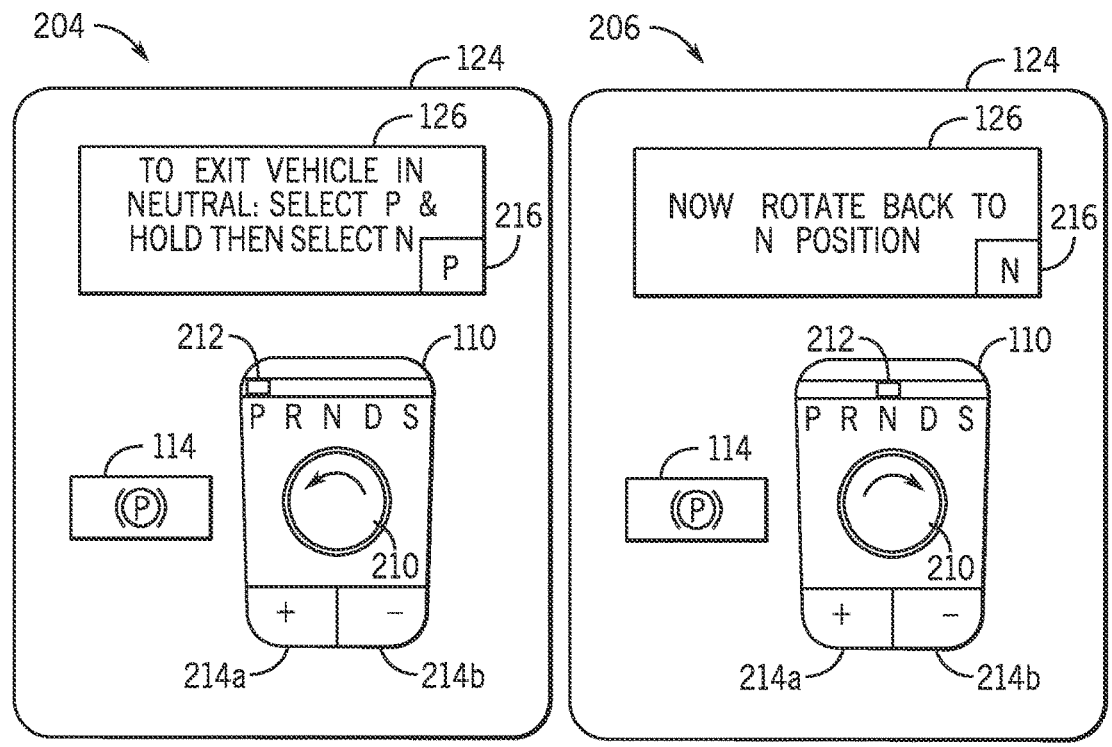
FIG. 2C is a top view of a vehicle interface located inside the vehicle of FIG. 1 showing another part of the input sequence according to an exemplary embodiment.
FIG. 2D is a top view of a vehicle interface located inside the vehicle of FIG. 1 showing another part of the input sequence according to an exemplary embodiment.
Figure 2E:
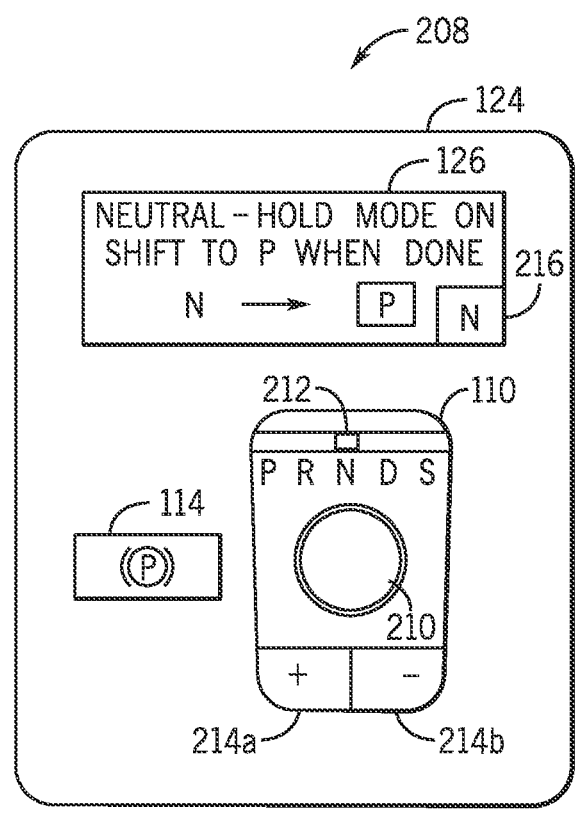
FIG. 2E is a top view of a vehicle interface located inside the vehicle of FIG. 1 showing another part of the input sequence according to an exemplary embodiment.
Figure 3:
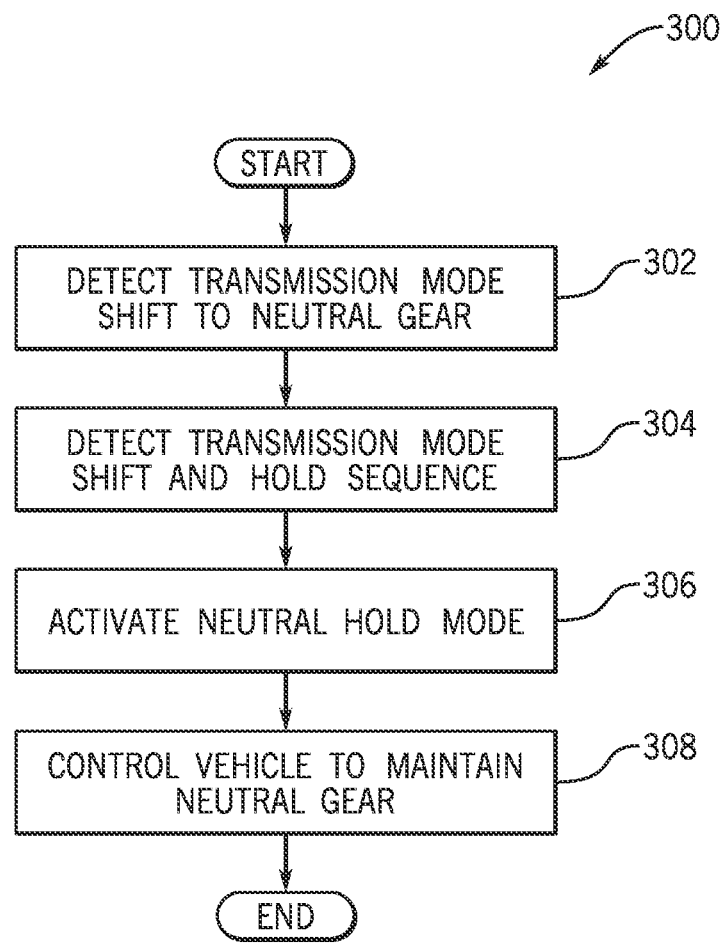
FIG. 3 is a process flow diagram of a method for neutral transmission hold according to an exemplary embodiment.

Exemplary methods for neutral transmission hold implementing the components of FIG. 1 and FIGS. 2A-2E will now be described with reference to FIG. 3. FIG. 3 depicts an exemplary method 300 describing operations of one or more components of FIG. 1 and FIGS. 2A-2E for neutral transmission hold according to one embodiment. For example, the method 300 describes operations implemented, at least in part, by the vehicle 100 and the controller 102 of FIG. 1. With reference to FIG. 3, at block 302, the method 300 includes detecting a transmission mode of the vehicle 100 is shifted into a neutral gear. For example, the controller 102 can detect a change in a position of the transmission input interface 210 indicating a transmission mode of the vehicle 100 is shifted into a neutral gear.

With reference to FIGS. 2A and 2B, an illustrative example of an input that changes the transmission mode to the neutral gear from a different gear (i.e., not the neutral gear) will be described. In FIG. 2A, the top view 200 illustrates the vehicle 100 is in a drive transmission mode as indicated by the position of the indicator 212 (i.e., under the letter "D") and the gear indicator 216. A user (not shown) can selectively shift the vehicle 100 into a transmission mode using the shift device interface 110 by manipulating the transmission input interface 210 (e.g., a rotary dial) to move the indicator 212 above the desired transmission mode. In this example, the user manipulates the transmission input interface 210 (e.g., by turning the dial) thereby moving a position of the indicator 212 from the letter "D", as shown in FIG. 2A, to the letter "N", as shown in FIG. 2B. This results in the shift device interface 110 transmitting a signal to the controller 102 to control the transmission 106 to shift from the drive transmission mode (e.g., a drive gear) into a neutral transmission mode (e.g., a neutral gear).

Accordingly, the vehicle 100 changes transmission modes from a first transmission mode (i.e., the driver transmission mode, not the neutral transmission mode) to the neutral transmission mode. In FIG. 2B, the top view 202 illustrates the input/output interface 124 where the vehicle 100 is in a neutral gear. Here, the gear indicator interface 216 displays a letter "N" indicating the current transmission mode of the vehicle 100. Additionally, the display 126 provides instructions for activating neutral hold mode, which will be described in more detail herein.

In some embodiments, the controller 102 detects a transmission mode of the vehicle 100 is shifted into a neutral gear based on the transmission 106 and/or the shift device interface 110, and detects the engine 104 is running. As mentioned above, the controller 102 is operatively connected for computer communication to the engine 104 and can receive signals and/or data (e.g., from vehicle sensors 116) about the state of the engine 104 (e.g., ON/OFF).

Referring again to FIG. 3, at block 304, the method 300 includes detecting and/or receiving an input sequence (e.g., a transmission shift-and-hold input sequence) at the transmission input interface, which indicates an intent for the vehicle 100 to enter a neutral hold mode. In one embodiment, the input sequence includes changing the position of the transmission input interface 210 to a park position, holding the position of the transmission input interface 210 at the park position for a predetermined length of time, and changing the position of the transmission input interface 210 to the neutral position. In another embodiment, the controller 102 receives an input sequence signal representing the input sequence where the input sequence signal includes a first input sequence signal and a second input sequence signal. The exemplary input sequence will now be described in more detail with reference to FIGS. 2B-2E.

As mentioned above, in FIG. 2B the top view 202 illustrates the input/output interface 124 where a neutral gear (e.g., neutral transmission mode) is engaged. In FIG. 2B, the display 126 provides instructions (e.g., the input sequence) for activating neutral hold mode. Specifically, the input sequence includes changing the position of the transmission input interface 210 to a park position and holding the park position for a predetermined length of time. Accordingly, the user can manipulate the transmission input interface 210 (e.g., turn the dial to the left) thereby moving the position of the indicator 212 to the park position (i.e., "P") as shown in a top view 204 of the input/output interface 124 in FIG. 2C. This results in the shift device interface 110 transmitting a first input sequence signal to the controller 102 indicating a change in a position of the transmission input interface 210 to a park position. The controller 102 can receive the first input sequence signal and detect the change in the position of the transmission input interface to the park position.

The user can hold the position of the transmission input interface in the park position for a predetermined length of time, for example, two (2) seconds. In one embodiment, the controller 102 compares a length of time the transmission input interface 210 is in the park position to a predetermined length of time $th_{NH}$, to determine if the length of time is greater than the predetermine length of time $th_{NH}$. In one embodiment, the controller 102 can start a timer upon detecting a change in the position of the transmission input interface 210 to the park position. Upon detecting the position of the transmission input interface 210 is no longer in the park position, which will be discussed below, the controller 102 can stop the timer. A length of time between the start of the timer and the end of the timer can be compared to the predetermine length of time $th_{NH}$ As mentioned above, the input sequence also includes changing the position of the transmission input interface 210 to the neutral position. More specifically, the controller 102 receives a second input sequence signal indicating a change in the position of the transmission input interface 210 from the park position, as shown in FIG. 2C, back to the neutral position, as shown in FIG. 2D. As shown by the top view 206 of FIG. 2D, the user can manipulate the transmission input interface 210 (e.g., turn the dial to the right) thereby moving the position of the indicator 212 from the park position (i.e., "P") back to the neutral position (i.e., "N"), the result of which is shown in the top view 208 of FIG. 2E.

Accordingly, responsive to receiving the input sequence described above at the transmission input interface 210, the controller 102 activates a neutral hold mode at block 306 of FIG. 3. The controller 102 can change a neutral hold mode of the vehicle 100 to active. For example, the controller 102 sets a status flag of the neutral hold mode stored at the controller 102 to "ON." The top view 208 in FIG. 2E illustrates the input/output interface 124 when neutral hold mode is engaged. The display 126 provides visual feedback indicating that neutral hold mode is ON. Additionally, the display 126 provides visual feedback with instructions on how to exit neutral hold mode. Specifically, in FIG. 2E, the visual feedback indicates an action and/or trigger to exit neutral hold mode, namely, to shift to a park position when done to exit neutral hold mode. In other embodiments, the action and/or trigger to exit neutral hold mode could be based on other factors, for example, whether the engine 104 is ON or OFF. In the example shown in FIG. 2E, the action and/or trigger to exit neutral hold mode by shifting to the park position is logical if the engine 104 is detected as being OFF. If the engine 104 is detected as being is ON, the action and/or the trigger to exit the neutral hold mode can be shifting to any position (e.g., another gear) other than the neutral position (i.e., the neutral gear).

Referring again to FIG. 3, at block 308, the method 300 includes controlling the vehicle 100 to maintain the neutral gear. Here, the controller 102 controls the vehicle 100 (e.g., the transmission 106) to maintain the neutral gear while the neutral hold mode is active. As will be discussed in more detail herein, the neutral gear is maintained regardless of certain trigger events that would typically result in the controller 102 shifting from the neutral gear to a different gear (e.g., an automatic park shift to parking function). For example, the controller 102 maintains the neutral gear responsive to a change in vehicle occupancy state when the neutral hold mode is active.

Figure 4:
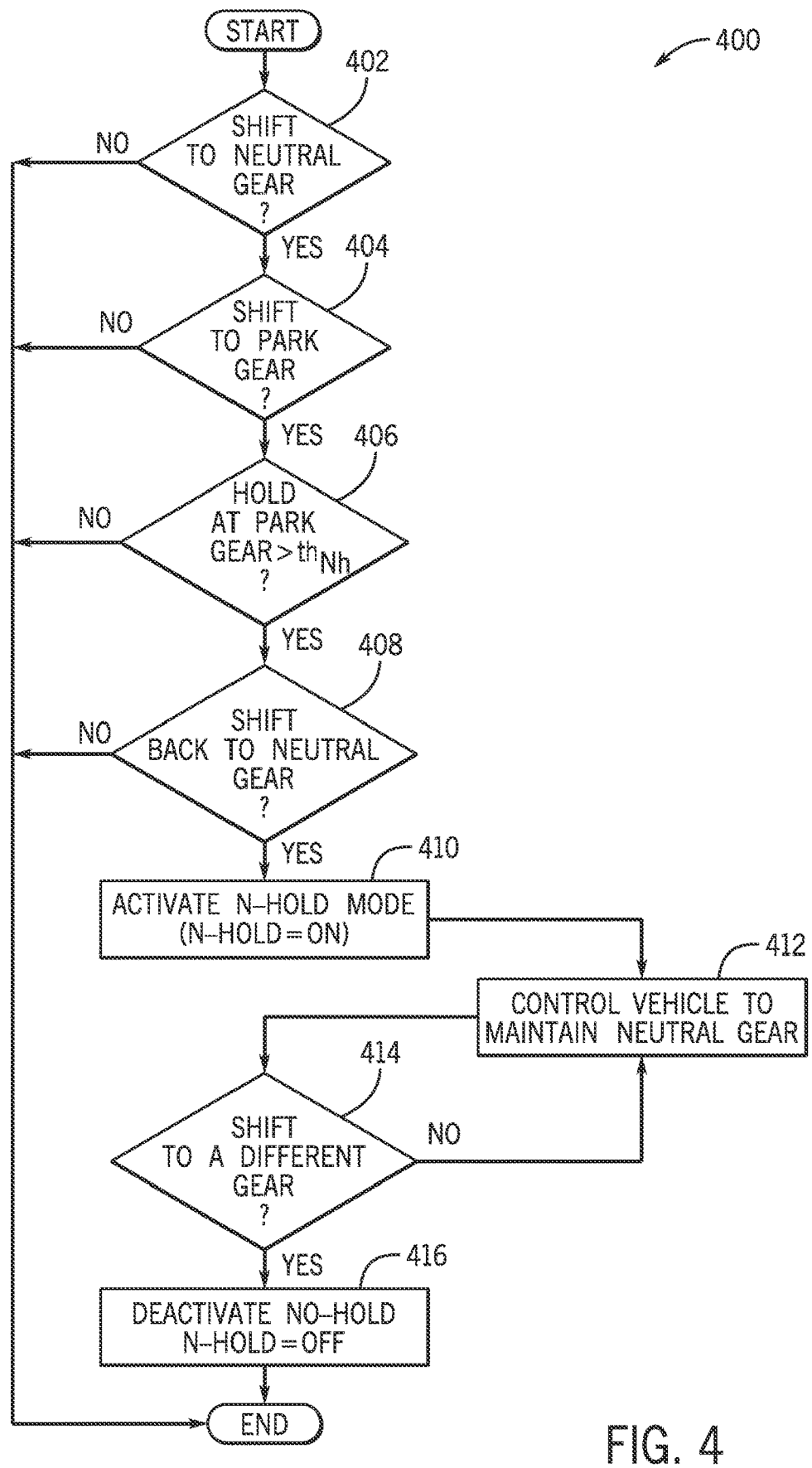
FIG. 4 is a process flow diagram of a method for neutral transmission hold according to another exemplary embodiment.

Referring now to FIG. 4, a method 400 describes operations of one or more components of FIG. 1 and FIGS. 2A-2E for neutral transmission hold according to another exemplary embodiment. The method 400 provides a more detailed description of the method 300, thus, reference will also be made to FIG. 1, FIGS. 2A-2E, and FIG. 3. At block 402, the method 400 includes detecting a shift to neutral gear, for example, a change from a different gear into a neutral gear. As discussed above in detail with block 302 of FIG. 3, the controller 102 can detect the shift into neutral gear based on communicating with the transmission 106 and/or receiving a signal from the shift device interface 110 (e.g., when a user controls the transmission input interface 210 to move the indicator 212 above the letter "N"). In one embodiment, upon detecting the transmission mode shift into the neutral gear, the controller 102 can control the display 126 to provide instructions to a user on how to activate neutral hold mode. For example, the display 126 in FIGS. 2B-2D provides instructions on the input sequence required to put the vehicle 100 into neutral hold mode. If the determination at block 402 is YES (i.e., neutral gear), the method 400 proceeds to block 404. If the determination at block 402 is NO, the method 400 ends.

At block 404, the method 400 includes detecting a change in the position of the transmission input interface 210 to a park gear. As discussed above in detail with block 304, the input sequence includes changing the position of the transmission input interface 210 to a park position. If the determination at block 404 is YES (i.e., park gear), the method 400 proceeds to block 406. If the determination at block 404 is NO, the method 400 ends.

At block 406, the method 400 includes determining if a hold at the park gear is greater than a predetermined length of time $th_{NH}$. As discussed above in detail with block 304 of FIG. 3, the input sequence includes holding the position of the transmission input interface 210 at the park position for a predetermined length of time $th_{NH}$. In one embodiment, the controller 102 compares a length of time the transmission input interface 210 is in the park position to a predetermined length of time $th_{NH}$, to determine if the length of time is greater than the predetermine length of time $th_{NH}$. In one example, the controller 102 stores the predetermined threshold $th_{NH}$ for use in the determination made at block 406. As an illustrative example, the predetermined threshold is two seconds. If the determination at block 406 is YES, the method 400 proceeds to block 408. If the determination at block 406 is NO, the method 400 ends.

At block 408, the method 400 includes detecting a change in the position of the transmission input interface 210 back to the neutral position. Similar to block 304 of FIG. 3, the controller 102 can receive a second input sequence signal indicating a change in the position of the transmission input interface 210 from the park position, as shown in FIG. 2C, back to the neutral position, as shown in FIG. 2D. If a change in the position of the transmission input interface 210 to the neutral position is detected at block 408, the method 400 proceeds to block 410. Otherwise, the method 400 ends.

At block 410, the method 400 includes activating neutral hold mode (N-HOLD). For example, as discussed above with block 306 of FIG. 3, the controller 102 sets a status flag (e.g., N-HOLD) stored at the controller 102 to "ON." In one embodiment, the controller 102 controls the display 126 to communicate information about the neutral hold mode to the user. As shown in FIG. 2D, the display 126 provides visual feedback indicating that neutral hold mode is active and provides instructions on how to exit the neutral hold mode.

Referring again to FIG. 4, at block 412, the method 400 includes controlling the vehicle 100 to maintain and/or hold the neutral gear (e.g., maintain the neutral transmission mode). Thus, the controller 102 controls the transmission 106 to maintain the neutral gear. As will be discussed in more detail herein, the neutral gear is maintained in response to trigger events, for example, a change in a vehicle occupancy state that would typically result in the controller 102 shifting from the neutral gear to a different gear.

At block 414, the method 400 includes detecting a change in the transmission mode, for example, detecting a shift from the neutral gear to a different gear. In one embodiment, at block 414, the controller 102 detects a shift from the neutral gear to the park gear. For example, the controller 102 can receive an input signal from the transmission input interface 210 indicating a change in the position of the transmission input interface from the neutral position to the park position. Thus, similar to block 402, the controller 102 can detect the shift from the neutral gear to the park gear based on communicating with the transmission 106 and/or receiving an input signal from the shift device interface 110 (e.g., when a user controls the transmission input interface 210 to move the indicator 212 above the letter "P").

If the determination at block 414 is YES (i.e., a different gear), the method 400 proceeds to block 416 where the neutral hold mode is deactivated. For example, the controller 102 sets the status flag (e.g., N-HOLD) to "OFF." This allows the transmission 106 to stop maintaining and/or holding the neutral gear and shift the vehicle 100 into the different gear. Thus, in some embodiments, the method 400 includes at block 414 controlling the vehicle 100 to release the neutral gear. If the determination at block 414 is NO, the method 400 returns to block 412 and continues to maintain and/or hold the neutral gear. Accordingly, neutral hold mode remains active until the transmission 106 is shifted into a different gear. Although not shown in FIG. 4, in some embodiments, the active state of the neutral hold mode can be deactivated by other actions and/or triggers. For example, if the engine 104 is detected to be OFF, the controller 102 can deactivate the neutral hold mode (e.g., change the status flag to OFF) after a predetermined time limit is reached. As an illustrative example, if the neutral hold mode is active for fifteen minutes and the engine 104 is OFF, the controller 102 can set the status flag (e.g., N-HOLD) to OFF.

Figure 5:
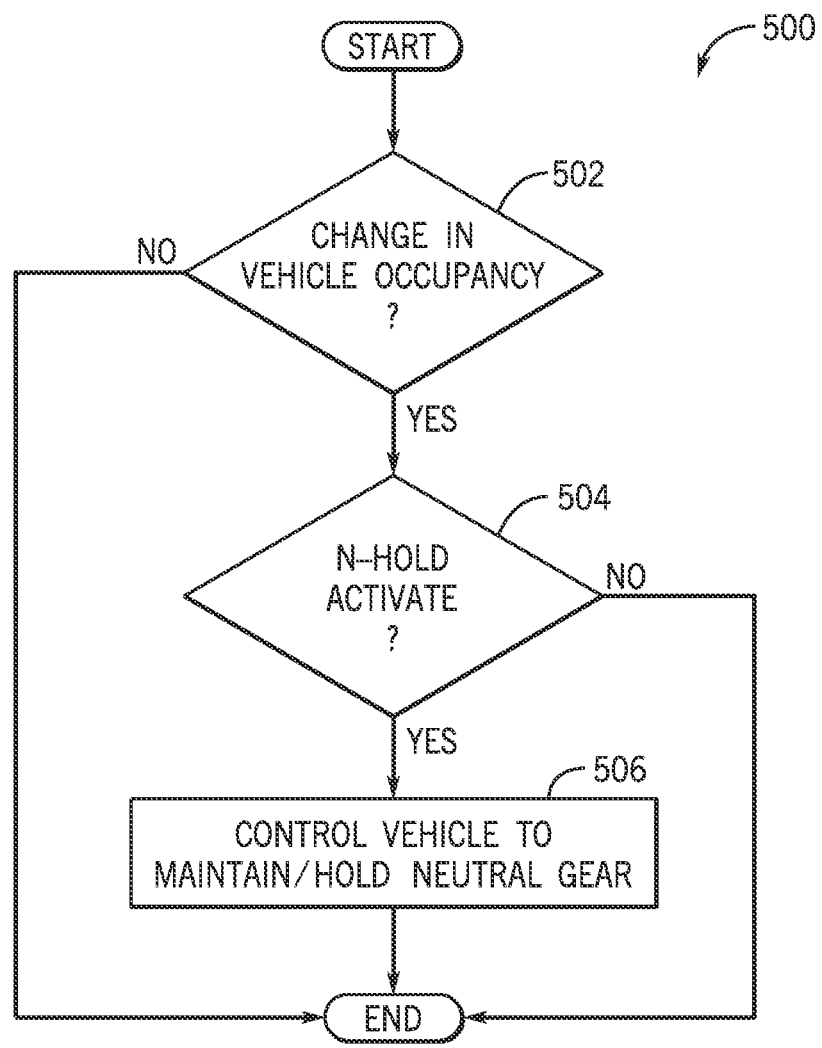
FIG. 5 is a process flow diagram of a method for neutral transmission hold according to a further exemplary embodiment.

As mentioned above, neutral hold mode enables the vehicle 100 to hold the transmission 106 in the neutral gear regardless of specific operations that would typically result in changing the neutral gear to a different gear. Referring now to FIG. 5, a method 500 describes operations of one or more components of FIG. 1 and FIGS. 2A-2E for neutral transmission hold based on a change in vehicle occupancy state according to an exemplary embodiment. At block 502, the method 500 includes detecting a change in vehicle occupancy state. For example, the controller 102 can detect the change in the vehicle occupancy state based on data from the vehicle sensors 116 and/or the occupancy sensors 118. A vehicle occupancy state can indicate a presence of a vehicle occupant in the vehicle 100, a position of a vehicle occupant in the vehicle 100, a count of vehicle occupants in the vehicle 100, an action or operation (e.g., entering/exiting the vehicle 100, locking/unlocking the seat belt locks 120, opening/closing the doors 122) in the vehicle 100. In one embodiment, detecting a change in a vehicle occupancy state includes detecting a vehicle door opening operation of the doors 122. In another embodiment, detecting a change in a vehicle occupancy state includes detecting a seat belt unlock operation of the seat belt locks 120. Detecting a change in the vehicle occupancy state will be discussed in more detail with FIG. 6.

Referring again to FIG. 5, if the determination at block 502 is NO (i.e., no change in vehicle occupancy state), the method 500 ends. If the determination at block 502 is YES (i.e., change detected), the method proceeds to block 504. At block 504, it is determined whether neutral hold mode is active. For example, the controller 102 can check whether the flag state N-HOLD is set to ON/OFF. If the flag state N-HOLD is set to ON, neutral hold mode is active, and the method proceeds to block 506. If the flag-state N-HOLD is set to OFF, neutral hold mode is inactive, and the method 500 ends.

At block 506, the method 500 includes controlling the vehicle 100 to maintain and/or hold the neutral gear. For example, as discussed above with block 412 of FIG. 4, the controller 102 controls the transmission 106 to maintain the neutral gear. Accordingly, regardless of the change in vehicle occupancy detected at block 502, the vehicle 100 holds the transmission 106 in the neutral gear.

Figure 6:
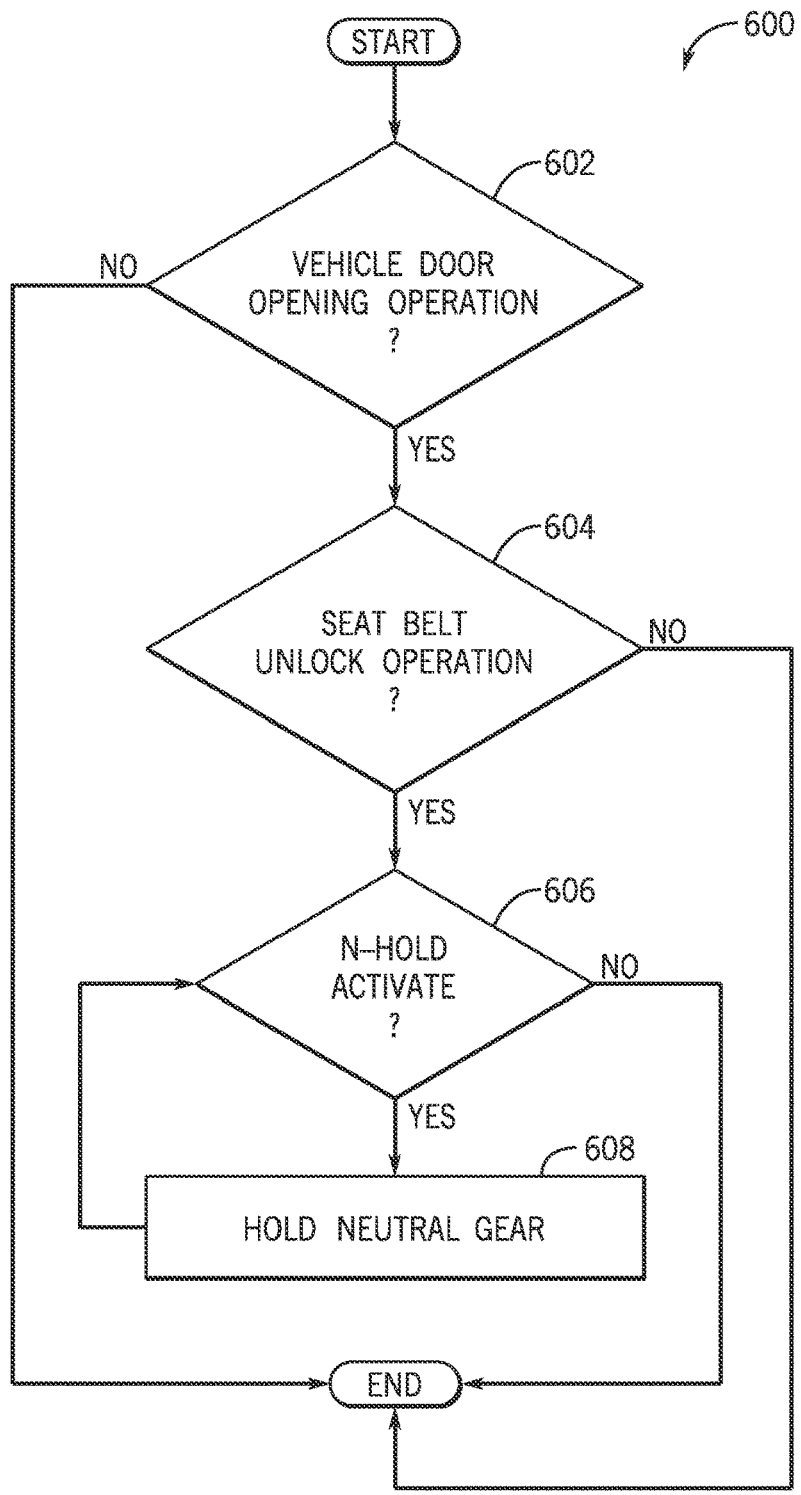
FIG. 6 is a process flow diagram of a method for detecting vehicle occupancy according to an exemplary embodiment.

Vehicle occupancy detection will now be described in more detail with respect to method 600 of FIG. 6. The method 600 describes operations of one or more components of FIG. 1 and FIGS. 2A-2E for neutral transmission hold based on vehicle occupancy state. As mentioned above, in one embodiment, a change in vehicle occupancy state is detected upon detecting a vehicle door opening operation and/or a seat belt unlock operation. In other words, in one embodiment, a change in vehicle occupancy state indicates a vehicle occupant is exiting the vehicle. Referring now to the method 600, at block 602, the method 600 includes detecting a vehicle door opening. For example, when a user opens the doors 122, a vehicle door opening operation signal is sent to the controller 102. Thus, the controller 102 can detect the change in vehicle occupancy state based on receipt of data from a vehicle door sensor (e.g., the occupancy sensors 118) indicating a vehicle door opening operation. If a vehicle door opening operation is detected at block 602 (i.e., YES), the method proceeds to block 604. Otherwise, the method 600 ends.

At block 604, the method 600 includes detecting a seat belt unlock operation. For example, when a vehicle occupant unlocks the seat belt locks 120, a seat belt unlock operation signal is sent to the controller 102. Thus, the controller 102 detects the change in a vehicle occupancy state based on receipt of data from a seat belt sensor (e.g., the occupancy sensors 118) indicating a seat belt unlock operation. If a seat belt unlock operation or a seat belt lock operation is detected at block 604 (i.e., YES), the method proceeds to block 606. Otherwise, the method 600 ends.

At block 606, the method 600 includes determining if neutral hold mode is active. For example, the controller 102 can check whether the flag state N-HOLD is set to ON/OFF. If the flag state N-HOLD is set to ON, neutral hold mode is active, and the method proceeds to block 608. If the flag-state N-HOLD is set to OFF, neutral hold mode is inactive, at the method 600 ends. Accordingly, when a vehicle occupancy state change is detected at block 602 and/or block 604 and neutral hold mode is active, at block 608, the controller 102 holds the transmission 106 in the neutral gear. Thus, in a situation when a vehicle occupant exits the vehicle 100 as detected at blocks 602, 604, and neutral hold mode is active, at block 608, the controller 102 holds the transmission 106 in the neutral gear thereby preventing an automatic shift to another gear (e.g., a park gear). Accordingly, the controller 102 can control the vehicle 100 to maintain the neutral gear regardless of detecting a vehicle door opening operation and/or a seat belt unlock operation. This provides intuitive control of the vehicle to ensure the vehicle maintains the desired transmission mode.

The embodiments discussed herein can also be described and implemented in the context of "computer-readable medium" or "computer storage medium." As used herein, "computer-readable medium" or "computer storage medium" refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling a vehicle, comprising:
    detecting a change in a position of a transmission input interface to a neutral position indicating a transmission mode of the vehicle is shifted into a neutral gear;
    responsive to receiving an input sequence at the transmission input interface, changing a neutral hold mode of the vehicle to active, wherein the input sequence at the transmission input interface includes changing the position of the transmission input interface to a park position, holding the position of the transmission input interface at the park position for a predetermined length of time, and changing the position of the transmission input interface to the neutral position; and
    controlling the vehicle to maintain the neutral gear responsive to a change in a vehicle occupancy state while the neutral hold mode is active.

2. The computer-implemented method of claim 1, wherein responsive to detecting a change in the position of the transmission input interface from the neutral position to the park position while the neutral hold mode is active, changing the neutral hold mode of the vehicle to inactive.

3. The computer-implemented method of claim 2, including controlling the vehicle to release the neutral gear when the neutral hold mode of the vehicle is changed to inactive.

4. The computer-implemented method of claim 1, wherein the predetermined length of time is two seconds.

5. The computer-implemented method of claim 1, wherein the transmission input interface includes a rotary dial and a change in the position of the rotary dial is associated with the transmission mode of the vehicle.

6. The computer-implemented method of claim 1, wherein a change in a vehicle occupancy state includes detecting a vehicle door opening operation.

7. The computer-implemented method of claim 1, wherein a change in a vehicle occupancy state includes detecting a seat belt unlock operation.

8. The computer-implemented method of claim 1, wherein controlling the vehicle to maintain the neutral gear responsive to the change in the vehicle occupancy state while the neutral hold mode is active includes controlling the vehicle to maintain the neutral gear regardless of detecting a vehicle door opening operation.

9. The computer-implemented method of claim 1, wherein controlling the vehicle to maintain the neutral gear responsive to the change in the vehicle occupancy state while the neutral hold mode is active includes controlling the vehicle to maintain the neutral gear regardless of detecting a seat belt unlock operation.

10. A vehicle control system, comprising:
an engine;
a transmission; and
a transmission input interface;
a controller operatively connected for communication with the engine, the transmission, and the transmission input interface, wherein the controller:
  detects a position of a transmission input interface is in a neutral position indicating a transmission mode of the vehicle is shifted into a neutral gear;
  detects an input sequence at the transmission input interface including changing the position of the transmission input interface to a park position, holding the position of the transmission input interface at the park position for a predetermined length of time, and changing the position of the transmission input interface to the neutral position;
  changes a neutral hold mode from inactive to active; and
  controls the transmission to maintain the neutral gear responsive to a change in a vehicle occupancy state while the neutral hold mode is active.

11. The vehicle control system of claim 10, wherein the controller detects a change in the transmission mode of the transmission from the neutral gear to a different gear position, and in response, the controller changes the neutral hold mode from active to inactive and the controller controls the transmission to release the neutral gear.

12. The vehicle control system of claim 10, wherein the transmission input interface includes a rotary dial and a change in the position of the rotary dial is associated with the transmission mode of the vehicle.

13. The vehicle control system of claim 10, wherein the controller detects the change in the vehicle occupancy state based on receipt of a vehicle door opening operation signal.

14. The vehicle control system of claim 10, wherein the controller detects the change in the vehicle occupancy state based on receipt of a seat belt unlock operation signal.

15. The vehicle control system of claim 10, wherein the controller maintains the neutral gear regardless of a vehicle door opening operation while the neutral hold mode is active.

16. A non-transitory computer-readable storage medium including instructions that when executed by a controller, causes the controller to:
  detect a position of a transmission input interface is in a neutral position indicating a transmission mode of a vehicle is in a neutral gear;
  receive an input sequence signal from the transmission input interface including a first input sequence signal indicating a change in a position of the transmission input interface to a park position and a second input sequence signal indicating a change in the position of the transmission input interface from the park position to the neutral position, wherein a length of time the transmission input interface is in the park position is greater than a predetermined length of time; and
  change a neutral hold mode to active and control the transmission to maintain the neutral gear regardless of a change in a vehicle occupancy state while the neutral hold mode is active.

17. The non-transitory computer-readable storage medium of claim 16, further causing the controller to change the neutral hold mode from active to inactive upon receipt of an input signal indicating a change in the position of the transmission input interface from the neutral position to the park position.

18. The non-transitory computer-readable storage medium of claim 16, further causing the controller to maintain the neutral gear regardless of a vehicle door opening operation while the neutral hold mode is active.

19. The non-transitory computer-readable storage medium of claim 16, further causing the controller to detect the change in a vehicle occupancy state based on receipt of data from a vehicle door sensor indicating a vehicle door opening operation.

20. The non-transitory computer-readable storage medium of claim 16, further causing the controller to detect the change in a vehicle occupancy state based on receipt of data from a seat belt sensor indicating a seat belt unlock operation.

* * * * *